No. 844,338. PATENTED FEB. 19, 1907.
W. M. ELLETT & R. M. VICK.
CREDIT CABINET.
APPLICATION FILED MAR. 13, 1905.
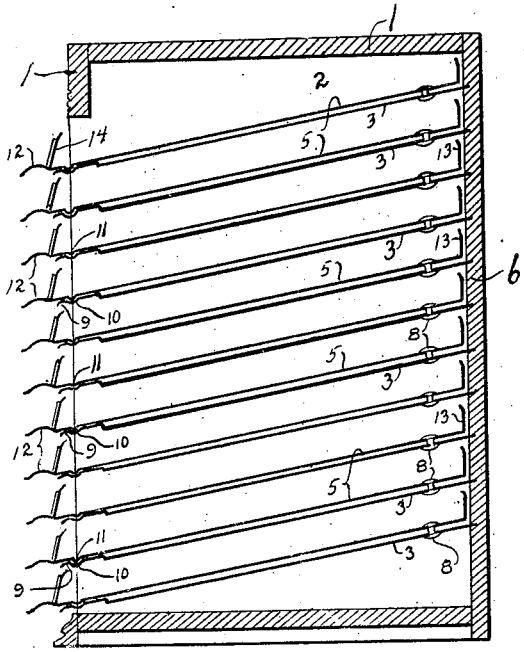
Fig. 1
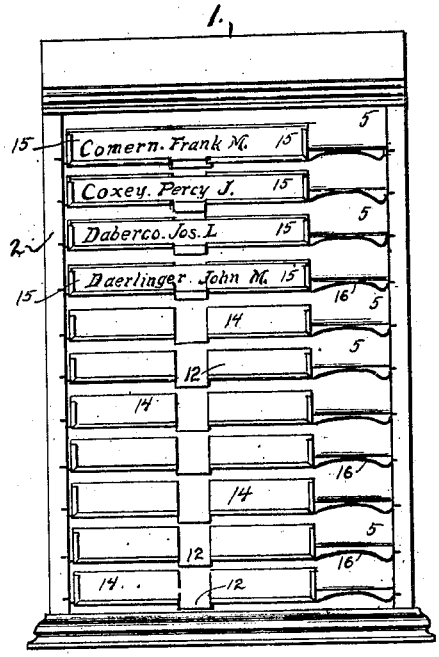
Fig. 2
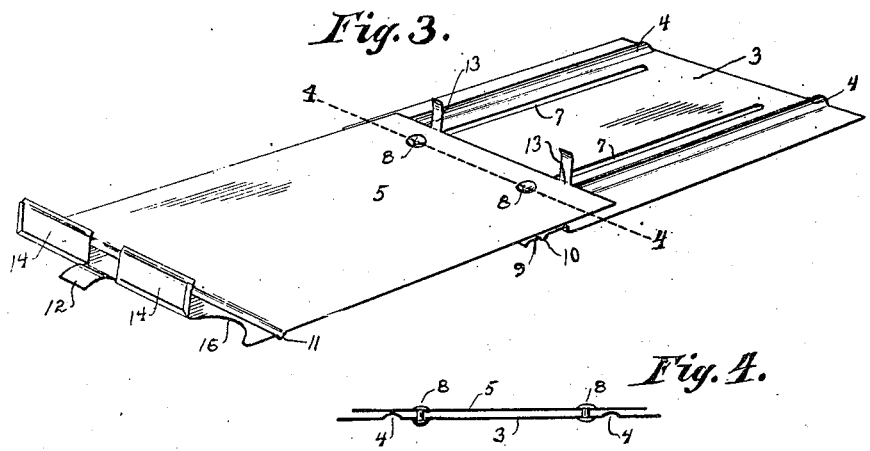
Fig. 3.
Fig. 4.
WITNESSES
Jos. J. Hosler
L. M. Bond.
INVENTORS
Walter M. Ellett.
Rollo M. Vick
BY
F. W. Bond
ATTORNEY

UNITED STATES PATENT OFFICE.

WALTER M. ELLETT AND ROLLO M. VICK, OF ALLIANCE, OHIO.

CREDIT-CABINET.

No. 844,338.      Specification of Letters Patent.      Patented Feb. 19, 1907.

Application filed March 13, 1905. Serial No. 249,748.

*To all whom it may concern:*

Be it known that we, WALTER M. ELLETT and ROLLO M. VICK, citizens of the United States, residing at Alliance, in the county of Stark and State of Ohio, have jointly invented certain new and useful Improvements in Credit-Cabinets; and we do hereby declare that the following is a full, clear, and exact description of the same, reference being had to the annexed drawings, making a part of this specification, and to the numerals of reference marked thereon, in which—

Figure 1 is a vertical section taken on a line from front to rear of the cabinet proper. Fig. 2 is a front elevation. Fig. 3 is a view of the sliding credit-slip-holding plate and its support and guide. Fig. 4 is a section taken on line 4 4, Fig. 3.

The present invention has relation to credit-cabinets; and it consists in the novel arrangement hereinafter described, and particularly pointed out in the claim.

Similar numerals of reference indicate corresponding parts in all the figures of the drawings.

In the accompanying drawings, 1 represents the case, which may be of any desired size, reference being had to the size of the cabinet designed to be constructed. To the upright members 2 of the case 1 are attached what we term "supporting-plates" 3, which plates may be of the form shown or they may be of different form, as their only object and purpose is to provide a support for the sliding credit-slip-holding plates and guides for said plates. For the purpose of reducing the frictional contact of the credit-slip-holding plates as they are moved back and forth the plates 3 are provided with the ribs 4, and upon which ribs the credit-slip plates 5 rest. The credit-slip plates 5 are formed somewhat narrower than the plates 3 and are so formed for the purpose of allowing the plates to be moved in and out without frictional contact against the inner faces of the upright members 2. The object and purpose of providing the plates 3 somewhat wider than the plates 5 is to provide means for seating the edges of the plates 3 into suitable grooves formed in the upright members 2, and, if desired, grooves may be formed in the back member 6 of the case 1 for the purpose of properly supporting the rear ends of the plates 3. For the purpose of forming guides for the plates 5 the plates 3 are provided with the elongated slots 7, through which elongated slots the rivets or their equivalents 8 are passed, which rivets are securely attached to the credit-slip plates 5 and of course moved back and forth in the slots 7 with said plates 5. For the purpose of providing a means for preventing any accidental displacement of the plates 5 when they are brought into their normal position the forward edges of the plates 3 are provided with the opposite curved portions or corrugations 9 and 10, the corrugation 10 being its concave surface located uppermost and the corrugation 9 being its convexed surface located upon the upper face or side of the plate 3.

The credit-slip-holding plates are provided with the downward-extended curved portion or grooved portion 11, said groove being located in such a position that when the plates 5 are brought into their normal position the down-curved portion 11 will come directly above the grooved or corrugated portion 10, by which arrangement the under side of the groove 11 will be located in the groove 10 sufficiently to prevent any accidental displacement of the plates 5 by reason of the curved portion of the groove 11 being located back of the corrugated portion 9. When it is desired to withdraw a credit-slip plate, its forward edge is sprung upward by means of lift-and-pull tang 12, thereby allowing the downward-extended portion 11, or, in other words, the rib, to pass over the corrugation 9, after which the slip is free to be moved or pulled outward and to be again placed in its normal position and held against displacement, as above described. The elongated slots 7 are formed of such a length that they will stop the outward movement of the credit-slip plates 5 by means of the rivets 8 coming in contact with the outer ends of the slot 7.

For the purpose of causing the credit-slips to move forward with the movement of the plates 5 the upward-extended tangs 13 are provided, which may be formed integral with the plates 5 or they may be made separate and attached to said plates in any convenient and well-known manner. For the purpose of providing a means for the proper keeping of accounts the forward edges of the plates 5 are each provided with the upward-extending flange 14 and are properly flanged to hold the tablets 15. For the purpose of convenience in removing the credit-slips we prefer to cut or form the recesses 16 in the forward edges of the plates 5, which recesses are located or formed in the plates at one end of the tablet-holding flanges 14, as best illustrated in Figs. 2 and 3.

Having fully described our invention, what we claim as new, and desire to secure by Letters Patent, is—

In a credit-cabinet, the combination of a casing, fixed plates provided with corrugations upon their forward edges, and movable plates located upon the fixed plates and provided with a grooved or corrugated portion upon their forward edges, said corrugated portion adapted to be seated in one of the corrugations in the fixed plates, substantially as and for the purpose specified.

In testimony that we claim the above we have hereunto subscribed our names in the presence of two witnesses.

WALTER M. ELLETT.
R. M. VICK.

Witnesses:
  WILLIAM L. HART,
  RUTH BURDGE.